US010574584B1

(12) United States Patent
Young (10) Patent No.: US 10,574,584 B1
(45) Date of Patent: Feb. 25, 2020

(54) CONTROLLING NETWORK DEVICE CAPACITY (71) Applicant: AMAZON TECHNOLOGIES, INC., Seattle, WA (US)

(72) Inventor: Lawrence Shao-Shien Young, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 579 days.

(21) Appl. No.: 15/077,224

(22) Filed: Mar. 22, 2016

(51) Int. Cl.
*G06F 15/173* (2006.01)
*H04L 12/911* (2013.01)
*H04L 12/26* (2006.01)
*H04L 12/24* (2006.01)

(52) U.S. Cl.
CPC ............ *H04L 47/70* (2013.01); *H04L 41/142* (2013.01); *H04L 43/0876* (2013.01)

(58) Field of Classification Search
CPC .... H04L 47/70; H04L 43/0876; H04L 41/142
See application file for complete search history.

(56) References Cited

U.S. PATENT DOCUMENTS

| | | | | |
|---|---|---|---|---|
| 2002/0065875 | A1* | 5/2002 | Bracewell | H04L 67/02 709/203 |
| 2014/0088979 | A1* | 3/2014 | Garman | G06Q 10/0631 705/1.1 |
| 2014/0304711 | A1* | 10/2014 | Tennant | H04W 4/00 718/104 |
| 2017/0193501 | A1* | 7/2017 | Cole | H04W 12/06 |

* cited by examiner

*Primary Examiner* — Richard G Keehn
(74) *Attorney, Agent, or Firm* — Blank Rome LLP (57) ABSTRACT

A web services system includes a plurality of computing devices configurable to implement a plurality of compute instances of a provider network. One or more of the computing devices is configured to implement a network device and a resource manager. The network device is configured to receive traffic directed to an application. The resource manager is configured to determine an amount of computing resources employed by the network device to process a first workload presented to the network device over a predetermined precedent time interval, to determine, based on the amount of computing resources employed by the network device, an amount of computing resources needed by the network device to process a second workload; and to allocate the amount of computing resources to the network device.

20 Claims, 7 Drawing Sheets

CONTROLLING NETWORK DEVICE CAPACITY

BACKGROUND

In network-based computing environments, multiple computers may be employed to manage incoming service requests. Load balancers may be used to distribute the service requests across the multiple computers. Distributing the service requests across the computers helps optimize resource utilization, maximize throughput, and avoid overload of any one of the computers. Typically, a load balancer receives a request from a client device, selects one of the multiple computers to service the request, and routes the request to the selected computer, which processes the request and issues a response. Load balancers generally attempt to distribute the request load evenly across all of the service computers in an effort to prevent any individual computer from being overloaded with requests.

BRIEF DESCRIPTION OF THE DRAWINGS

For a detailed description of various examples, reference will now be made to the accompanying drawings in which.

DETAILED DESCRIPTION

The present disclosure is directed to technologies for managing the computing resources allocated to a network device, such as a network address translator, load balancer, etc. More specifically, in the computing system disclosed herein the amount of computing resources allocated to the network device can be adjusted as needed, during ongoing operation, to accommodate processing of a given workload. The type and quantity of computing resources allocated to the network device may be selected based on historical utilization of the computing resources by the network device. Embodiments track network device resource utilization and analyze historical resource utilization to determine an amount of computing resources sufficient to process the given workload while reducing the cost and resource waste associated with over-allocation of computing resources.

In a web-based computing system, the network traffic (e.g., number of requests) directed to a particular application, and to the computers that execute the application, can vary over time. For example, the number of requests directed to an application may increase or decrease at various times based on the number of clients attempting to access the application. To address such variation in load, a web service provider may adjust the amount of computing resources dedicated to an application, i.e., adjust the amount of resources dedicated to servicing requests directed to the application, based on the number of requests, or based on the utilization of the computing resources available to the application for responding to the requests. For example, if computing resources currently allocated to an application are fully utilized to service incoming requests, then additional computing resources may be allocated to the application to reduce the overall resource utilization. Similarly, if computing resources currently allocated to an application are underutilized to service incoming requests, then computing resources may be deallocated from the application to increase the overall resource utilization. By adjusting the amount of computing resources allocated to an application in this manner quality of service can be maintained while minimizing overall expense.

A customer of a web service provider may execute instances of an application via virtual machines, where the virtual machines are executed by one or more computers. The web service provider may allocate additional computing resources to the application by creating one or more additional virtual machines and executing an instance of the application in each of the newly created virtual machines. The web service provider may deallocate computing resources from the application by halting a virtual machine, and associated application instance, and freeing the computing resources for reallocation as needed.

As noted above, a load balancer may be applied to distribute service requests across the various instances of the application. As described for the application associated with the load balancer, the web service provider may adjust the computing resources allocated to the load balancer to allow the load balancer to provide timely processing of service requests under changing load conditions. For example, if computing resources currently allocated to a load balancer are insufficient to provide timely processing of incoming requests, then additional computing resources may be allocated to the load balancer to reduce the overall resource utilization and improve request processing times. Similarly, if computing resources currently allocated to the load balancer are underutilized, then computing resources may be deallocated from the load balancer to increase the overall resource utilization with no resultant increase in request processing time. The web service provider may increase the amount of computing resources dedicated to the load balancer by creating an additional virtual machine and executing an additional instance of the load balancer in the newly created virtual machine. The web service provider may deallocate computing resources from the load balancer by halting a virtual machine, and associated load balancer instance, and freeing the computing resources associated with the virtual machine for reallocation as needed.

To facilitate selection of an amount of computing capacity to allocate to the network device, the web service provider may include a resource manager that monitors the utilization of computing resources by the network device over time. Via the resource utilization monitoring, the web service provider can determine various parameters of resource utilization that can be applied to determine an amount of computing resources to allocate to the network device. For example, by monitoring utilization of computing resources, the resource manager can determine maximum resource utilization for a given workload in a given time interval, average resource utilization for the given workload in the given time interval, and volatility of resource utilization for the given workload in the time interval. The resource manager can apply the parameters of resource utilization to select the type and amount of computing resources to allocate to the network device.

In some embodiments, an amount of computing resources to be allocated to the network device may be selected to be a percentile of the resource utilization measurements acquired over a predetermined time interval. The percentile of a given resource utilization measurement may be determined as the percentage of the resource utilization measurements that are smaller than the given resource utilization measurement. Thus, the 90th percentile resource utilization measurement in the predetermined time interval is resource utilization measurement that is larger than 90% of the resource utilization measurements in the predetermined time interval. For example, the 100th percentile of the amount computing resources utilized by the network device over the last 72 hours may be allocated to the network device, or the 99th percentile of the amount computing resources utilized by the network device over the last 7 days may be allocated to the network device, or the 90th percentile of the amount computing resources utilized by the network device over the last 14 days may be allocated to the network device.

In some embodiments, a percentage of the maximum, average, or other statistical measure of computing resources utilized by the network device over a predetermined time interval may be allocated to the network device. For example, 100% of the amount computing resources utilized by the network device over the last 72 hours may be allocated to the network device, or 99 percent of the amount computing resources utilized by the network device over the last 7 days may be allocated to the network device, or 90 percent of the amount computing resources utilized by the network device over the last 14 days may be allocated to the network device.

Similarly, volatility of computing resource utilization may influence the amount of computing resources selected for allocation to the network device. For example, the standard deviation, variance or other measure of volatility may be determined for computing resource utilization in the given time interval, and an amount of computing resources to be allocated to the network device increased based on higher volatility.

In some embodiments, the amount of computing resources to be allocated to the network device may be affected by the amount of computing resources allocated to process output of the network device. For example, if the network device is a load balancer, then the amount of computing resources applied to process traffic distributed by the load balancer may be considered for determination of the amount of computing resources to allocate to the load balancer, with a larger amount of computing resources applied to process load balancer traffic output indicating that a larger amount of computing resources should be allocated to the load balancer to distribute the traffic.

A network device utilizes a number of different computing resources to process traffic. For example, the computing resources utilized may include processor capacity, memory, secondary storage, network bandwidth, etc. Monitoring of network device computing resource utilization may include measuring use of each of these different computing resources. Measurements of utilization of each such resource may be stored for use in determining the type and amount of computing resources to be allocated to the network device. In some embodiments, the measurements may be expressed in a standard unit that specifies a predetermined amount of each of the different computing resources. For example, one standard unit of computing resources may specify a predetermined amount of processor capacity, a predetermined amount of volatile memory, a predetermined amount of secondary storage, and a predetermined number of network transfers over a predetermined time interval. The web service provider may express each different measured computing resource in terms of the standard units of computing resources. Consequently, each different computing resource utilized by the network device may require a different number of standard units of the computing resources. By identifying the different number of standard units of computing resources needed to satisfy each different computing resource utilized, the web service provider can identify which of the resources is most highly utilized. That is, the web service provider can identify which of the different computing resources utilized required the most standard units of the computing resources over time, and in turn the web service provider can identify the maximum number of standard units of the computing resources needed to process traffic over time.

Having determined the historical computing resource utilization of the network device, either in standard units or measurements for each different computing resource, the web service provider can select the type and amount of resources to be allocated to the network device. In some embodiments, computing resources may be provided in packages, termed compute instances. Multiple different types of compute instances may be provided, and each different type of compute instance may provide an amount of each type of computing resource. For example, each type of compute instance may provide a different amount of processor capacity, a different amount of volatile memory, a different amount of non-volatile storage, a different amount of network capacity, etc. The web service provider may select the compute instances to be allocated to the network device from a number of different types of available compute instances. In some embodiments, the web service provider may select a type of compute instance to allocate to the network device such that the amount of computing resources needed by the network device is provided at the lowest cost, provided via the lowest number of compute instances, or provided via the lowest number of a same type of compute instance. For example, if memory is the particular computing resource most highly utilized by the network device in a given time interval, then the web services platform may select the type of compute instance that provides memory at lowest cost to allocate to the network device.

While techniques for allocating computing resources are illustrated herein primarily with respect a load balancer, the computing resource allocation techniques disclosed herein are application to a wide variety of network devices. A load balancer is only one example of such a network device. Examples of other network devices to which the computing resource reservation techniques disclosed herein may be applied include network address translators and other devices that process network traffic in a web services system.

Figure 1:
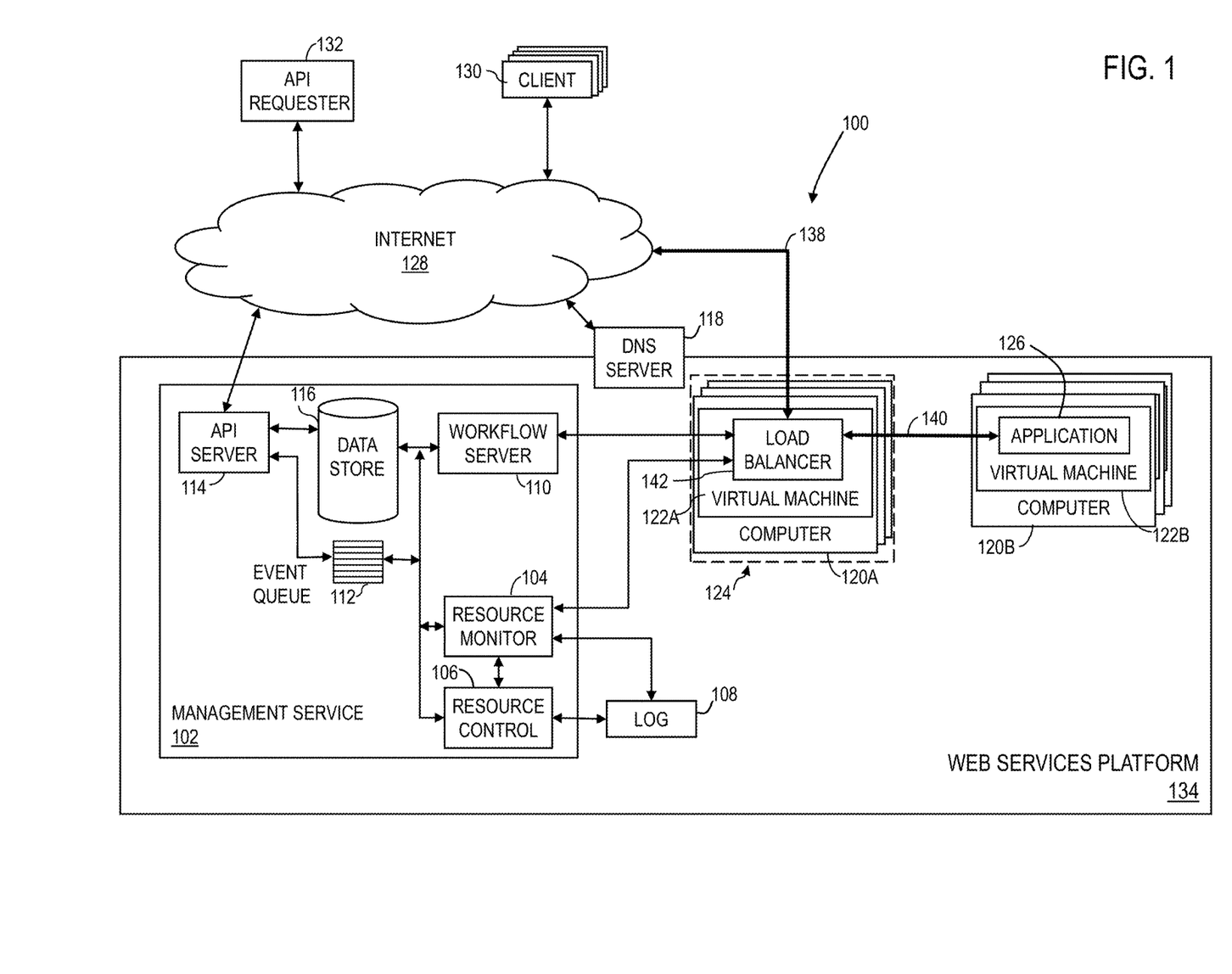
FIG. 1 shows a schematic diagram of a system architecture that provides control of load balancer computing resources in accordance with various embodiments.

FIG. 1 shows a schematic diagram of a system architecture that provides control of load balancer computing resources in accordance with various embodiments. The system architecture 100 includes a web services platform 134 that communicates with an application programming interface (API) requestor 132 and one or more clients 130 via the Internet 128. The API requestor 132 is a management entity that provides control information to the web services platform 134, and receives status information from the web services platform 134. The API requestor 132 may be a management console presented in a web browser executed by a computer, a command line interface executed by a computer, an automated management system or script executed by a computer, etc. A customer (e.g., a business entity) of a web services provider may utilize the API requestor 132 to receive status information from the web services platform 134 and to provide control information to the web services platform 134.

The clients 130 are computing devices that request services from an application executed by the web services platform 134. A computing device suitable for use as an API requestor 132 or client 130 may be a desktop computer, a laptop computer, a tablet computer, a smartphone, or other computing device.

The domain name service (DNS) server 118 stores DNS records that may include network addresses (e.g., internet protocol (IP) addresses) of servers that correspond to domain names. For example, DNS server 118 may receive hypertext transfer protocol (HTTP) requests from clients 130 for IP addresses via which services provided by the web services platform 134 may be accessed. On receipt of such a request, the DNS server 118 may perform a look-up function and return IP addresses to the clients 130.

The web services platform 134 includes a plurality of computers 120 (120A, 120B, etc.). The plurality of computers 120B are arranged to execute applications 126 that provide services to the clients 130. The web services platform 134 may execute multiple instances of the application 126 to provide a desired quality of service to the clients 130. In an example embodiment, the web services platform 134 executes each instance of the application 126 in a virtual machine 122B or a container (not illustrated). Each virtual machine 122 is executed by a computer 120B. As each additional instance of the application 126 is created, the web services platform 134 allocates a computer 120B to the application, creates an instance of the virtual machine 122B on the computer 120B, and executes the instance of the application 126 on the virtual machine 122B. By varying the number of instances of application 126 executing on a virtual machine 122B, the web services platform 134 scales the computing resources dedicated to the application 126 as needed to provide a desired quality of service.

To control distribution of requests 138 received from the clients 130 to the instances of the application 126, as requests 140, the web services platform 134 instantiates a virtual load balancer 124. The load balancer 124 is executed in one or more virtual machines 122A by one or more computers 120A. The web services platform 134 scales load balancer 124 by increasing or decreasing the number of virtual machines 122A executing an instance of the load balancer 124. As the number of virtual machines 122A changes, the amount of computing resources applied to execute the virtual machines 122A also changes. The load balancer 124 may distribute request traffic to the applications 126 by random selection, round robin distribution, or may implement one or more algorithms to distribute traffic. For example, for routing requests, the load balancer 124 may take into account factors, such as an application's reported load, recent response times, number of active connections, geographic location, number of requests an application has recently been assigned, etc.

The web services platform 134 includes a management service 102 that controls operation of and allocation of computing resources to the load balancer 124. The management service 102 includes an API server 114, a data store 116, an event queue 112, a workflow server 110, a resource control service 106, and a resource monitor 104. The resource monitor 104 and the resource control service 106 collectively form a resource manager that directs the allocation of computing resources to the load balancer 124. The API server 114 receives requests from the API requester 132 and configures the management service 102 to execute the requests. For example, the API server 144 may receive a request to create a load balancer 124, modify the load balancer 124, configure the load balancer 124, etc. On receipt of a request from the API requestor 132, the API server 114 may store parameters received as part of the request in the data store 116. The data store 116 provides persistent storage for parameters of the load balancer 124 and can be implemented using a database or database service or a block or object store. Parameters received as part of a request may include parameters for configuring the load balancer 124, a request identifier, an identifier for the customer and parameters specific for the load balancer 124. For example, the parameters may include values related to controlling the amount of computing resources to allocate to the load balancer 124. The API server 114 may also store an event flag in the event queue 112 to indicate that an operation is to be performed with respect to the load balancer 124. The event queue 112 stores flags that trigger the workflow server 110 to perform an operation.

The workflow server 110 manages the load balancer 124 based on the information stored in the data store 116. For example, the workflow server 110 may create a virtual machine 122A and an instance of the load balancer 124 as needed to route requests received from the clients 130, modify existing instances of the load balancer 124, etc. based on the information stored in the data store 116. In a specific example, this can include configuring the workflow server 110 with executable code that causes it to access the data store 116 and/or the event queue 112 to check for new requests. The workflow server 110 monitors the event queue 112 for flags indicating that an operation affecting the load balancer 124 is to be performed. If the workflow server 110 reads an event flag from the event queue 112, the workflow server 110 may perform operations to configure the load balancer 124 as indicated by the parameters stored in the data store 116. For example, in response to reading an event flag from the event queue 112, the workflow server 110 may assign an amount of computing resources for use by the load balancer 124 by creating a virtual machine 122A and executing a load balancer node 142 on the virtual machine 122A.

The resource monitor 104 tracks the operation of the load balancer 124 over time to measure an amount of computing resources utilized by the load balancer 124 to distribute requests 138 received from the clients 130. The resource monitor 104 may store measurements of computing resource utilization in a data storage device for later use in determining the amount of computing resources to be allocated to the load balancer 124. For example, the resource monitor 104 may include its own data store, log 108, or use data store 116 to store metrics associated with the utilization of computing resources by the load balancer 124. Each load balancer can be assigned an internal identifier and/or a customer identifier (identifying the customer associated with the load balancer) that are associated with the metrics for the load balancer, etc. The computing resources utilized by the load balancer 124 include processor capacity, memory, secondary storage, and network bandwidth. The computing resources are allocated to the load balancer 124 via the computer 120A. An example of a computer and the types of computing resources applied to implement the load balancer 124 are shown in FIG. 8, which is discussed below.

The resource monitor 104 may store individual measurements of utilization of each different computing resource. The load balancer 124 may include an agent that measures utilization of computing resources by the load balancer 124. For example, such an agent may periodically measure utilization of processor resources, volatile and non-volatile storage, and network access by the load balancer 124 and transfer resource utilization measurements to the resource monitor 104. The resource monitor 104 may store the individual measurements in the data store 116 or other storage device.

In some embodiments, measurements of each different type of computing resource applied by the load balancer 124 may be expressed in standard units, such as load balancer capacity units (LCUs). An LCU is a standard resource capacity unit that reflects and quantifies an amount of each of the computing resources utilized by the load balancer 124. One LCU may represent a predetermined amount of processor capacity, a predetermined amount of volatile memory, a predetermined amount of non-volatile storage, a predetermined amount of network bandwidth, etc. For example, one LCU may represent processor capacity equivalent to a selected microprocessor, a selected number of gigabytes of volatile memory, a selected number of gigabytes of secondary storage, and a selected number of network transfers per second.

The resource monitor 104 may calculate LCU utilization based on the resource utilization measurements by identifying the computing resource most highly utilized by the load balancer 124 and computing the number of LCUs corresponding to the utilization of the most highly used resource. For example, if a type of compute instance (corresponding to 2 LCUs) has been allocated to the load balancer 124, and the resource utilization measurements indicate that the load balancer 124 is utilizing 45% of the available processor resources, 40% of the available volatile memory, 35% of the available non-volatile memory, and 25% of the available network resources, then the resource monitor 104 may compute LCU utilization for the load balancer 124 as:

0.45×2=0.9 LCUs, where:
at 45% utilization, processor resources are the most highly used of the measured resources; and
2 LCUs are allocated to the load balancer 124.

In some embodiments of the resource monitor 104, LCU utilization may be computed as the average of the various resource utilization values included in resource utilization measurements, the median of the various resource utilization values included in resource utilization measurements, or other statistical function of the various resource utilization values included in resource utilization measurements.

The resource control service 106 retrieves the computing resource utilization history of the load balancer 124 (i.e., the utilization measurements stored by the resource monitor 104), and using the resource utilization tracked over time, the resource control service 106 determines an amount of computing resources to allocate to the load balancer 124 to support processing of the particular workload reflected in the utilization history. The resource control service 106 may compute various statistical values that characterize the utilization of computing resources by the load balancer 124 over a selected time interval. For example, the resource control service 106 may retrieve computing resource utilization measurements for a selected time interval from the data store 116 and/or the log 108 and for the time interval compute the maximum computing resource utilization, the mean computing resource utilization, the median computing resource utilization, standard deviation of the computing resource utilization, variance of the computing resource utilization, or other statistical values related to resource utilization.

Based on the computed statistical values, the resource control service 106 may determine an amount of computing resources to allocate to the load balancer 124. The resource control service 106 may, in some embodiments, select an amount of resources to allocate to the load balancer 124 as a percentile of the values of resource utilization measured over a period of operation. For example, the resource control service 106 may select the 100th percentile of the measured amounts of computing resources utilized by the load balancer 124 over a relatively short interval, such as the last 3 days, to be allocated to the load balancer 124, or select the 99th percentile of the measured amounts of computing resources utilized by the load balancer 124 over a longer period, such as the last 7 days, to be allocated to the load balancer 124, or select the 90th percentile of the measured amounts computing resources utilized by the load balancer 124 over a yet longer interval, such as the last 14 days, to be allocated to the load balancer 124. Selection of a percentile value from a longer measurement interval may provide a higher confidence that the amount of resources allocated will be sufficient to satisfy the resource needs of the load balancer 124.

In some embodiments, the resource control service 106 may select a percentage, of a statistical value, such as maximum resource utilization or average resource utilization, to be the amount of computing resources to allocate to the load balancer 124. For example, the resource control service 106 may select 100% of the maximum amount of computing resources utilized by the load balancer 124 over a relatively short interval, such as the last 3 days, to be allocated to the load balancer 124, or select 99 percent of the maximum amount computing resources utilized by the load balancer 124 over a longer period, such as the last 7 days, to be allocated to the load balancer 124, or select 90 percent of the maximum amount computing resources utilized by the load balancer 124 over a yet longer interval, such as the last 14 days, to be allocated to the load balancer 124. Other embodiments, may select a percentage of the average or other measure or computing resource utilization over the time interval.

In some embodiments, selection of an amount of computing resources to allocate to the load balancer 124 may also consider the volatility of the load balancer's historical resource utilization. As explained above, the resource control service 106 may compute a measure of volatility, such as standard deviation or variance, of resource utilization over a selected time interval. The resource control service 106 may increase the amount of computing resources allocated to the load balancer 124 to lessen the effects of volatility. For example, an amount of computing resources equal to the average of the computing resources utilized by the load balancer 124 over a selected interval increased by a factor related to volatility may be selected for allocation to the load balancer 124. If volatility is low, then the resource control service 106 may not increase, or increase to a lesser degree, the amount of computing resources to be allocated to the load balancer 124 because the risk of a sudden change in loading is low.

The resource control service 106 may also consider the amount of computing resources allocated to service traffic output 140 of the load balancer 124 in setting the amount of computing resources to allocate to the load balancer 124. In such embodiments, the amount of computing capacity to be allocated to the load balancer 124 may be set or adjusted in correspondence with the amount of computing resources assigned to process traffic output 140 of the load balancer 124. Thus, if a larger amount of computing resources is assigned to the application 126, then the resource control service 106 may correspondingly increase the amount of computing resources to be allocated to the load balancer 124. Similarly, if a smaller amount of computing resources is assigned to the application 126, then the resource control service 106 may correspondingly decrease the amount of computing resources to be allocated to the load balancer 124.

In order to ensure that the load balancer 124 has sufficient computing resources to process sudden increases in network traffic, the resource control service 106 may increase the amount of computing resources selected based on analysis of historical resource utilization by a predetermined scaling factor. For example, if it is deemed desirable to maintain computing resource utilization at no more than 40% of allocated computing resources, then the resource control service 106 may determine that 2.5 times (250% of) the amount of computing resources historically utilized (e.g., the amount of computing resources selected as a percentile or percentage of historically utilized resources) be allocated to the load balancer 124. Various embodiments of the resource control service 106 may apply different multipliers to the amount of computing resources historically utilized.

In the web services platform 134, computing resources may be provided in packages, termed compute instances. Multiple different types of compute instances may be provided, and each different type of compute instance may provide an amount of processor capacity, an amount of volatile memory, an amount of non-volatile storage, etc. For example, a type of compute instance designated as "large" may provide processor capacity X, volatile memory—Y GB; non-volatile storage—Z GB, a type of compute instance designated as "x-large" may provide processor capacity 2*X, volatile memory—2*Y GB; non-volatile storage—2*Z GB, a type of compute instance designated as "xx-large" may provide processor capacity 4*X, volatile memory—4*Y GB; non-volatile storage—4*Z GB, etc. In some embodiments of the web services platform 134, an LCU may represent the computing resources provided by the "large" compute instance, so 2 LCUs may represent the computing resources provided by 2 large compute instances (or the "x-large" compute instance if the x-large instance is twice as "large" as a large instance). Some embodiments of the web services platform 134 may provide different and/or additional compute instances. Similarly, the resources represented by an LCU may differ in various embodiments of the web services platform 134.

As noted above, the resource control service 106 determines the amount of computing resources to be allocated to the load balancer 124. Computing resources may be measured in LCUs or in units appropriate to each resource type, such as gigabytes for memory. In embodiments in which computing resources are provided via compute instances, the resource control service 106 selects the type and number of compute instances to be allocated to the load balancer 124 based on a variety of factors. The resource control service 106 selects a type and amount of compute instances that provide the requisite computing resources. The compute instances may also be selected based on relative cost to provide the needed computing resources. If, for example, compute instances of a first type and compute instances of a second type both provide the needed computing resources, but the compute instances of the first type provide the needed computing resources at a lower cost than the compute instances of the second type, then the resource control service 106 may select the compute instances of the first type to be allocated to the load balancer 124. Thus, the resource control service 106 may seek to reduce the cost of the computing resources allocated to the load balancer 124.

In some embodiments, the resource control service 106 may attempt to reduce or minimize the number of compute instances allocated to the load balancer 124. Thus, if fewer compute instances of a first type are needed to provide the requisite computing resources to the load balancer 124, than would be needed if a second type of compute instance were selected, then the resource control service 106 may select the compute instances of the first type to be allocated to the load balancer 124. That is, the resource control service 106 may select a type of compute instance that provides a greatest amount of a most needed computing resource to allocate to the load balancer 124. Some embodiments of the resource control service 106 may consider unit cost in conjunction with the amount of a computing resource provided by a compute instance. In such embodiments, the resource control service 106 may select a type of compute instance that provides the most needed computing resource, or at least a predetermined amount of the most needed computing resource, at lowest cost relative to the various types of compute instances available for allocation to the load balancer 124. Thus, the resource control service 106 may seek to reduce the number and/or cost of the computing resources allocated to the load balancer 124. In some embodiments, the compute instances allocated to the load balancer 124 must be of a same type. In other embodiments, the compute instances allocated to the load balancer 124 may be of different types.

The resource control service 106 may also consider the computing resource utilization history of different instances of the load balancer, alone or in conjunction with utilization history of the load balancer 124, to determine an amount of computing resources to allocate to the load balancer 124. The resource control service 106 may retrieve and analyze computing resource utilization history for one or more different load balancers assigned to a same customer of the web service provider as the load balancer 124. The resource control service 106 may retrieve computing resource utilization measurements for the different load balancer(s) from the log 108 or other storage device, compute statistics of the historical computing resource utilization for the different load balancer(s), and select an amount of computing resources to allocate to the load balancer 124 based on the historic computing resource utilization of the different load balancer using techniques disclosed herein with reference to the load balancer 124. For example, the resource control service 106 may select a percentile value of measurements of resource utilization of a different load balancer collected over a historical time interval to specify an amount of computing resources to allocate to the load balancer 124. The resource control service 106 may also adjust the amount of computing resources to allocate to the load balancer 124 based on a measure of volatility of computing resource utilization for the different load balancer(s). In the same way as explained herein with respect to the load balancer 124, the resource control service 106 may increase the amount of computing resources to be allocated to the load balancer 124 with higher values of computing resource utilization volatility in the different load balancers.

The resource monitor 104 records load balancer 124 computing resource utilization measurements. The resource control service 106 determines, based on the recorded resource utilization measures, an amount of computing resources to allocate to the load balancer 124. At least some of the information provided by the resource monitor 104 and the resource control service 106 may be provided to a customer associated with the load balancer 124 to aid the customer in understanding load balancer resource utilization. In some embodiments, the determination of an amount of computing resources to be allocated to the load balancer 124 may be fully automated. In other embodiments, the customer may provide parameters that the resource control service 106 applies to determine an amount of computing resources to allocate to the load balancer 124.

Figure 6:
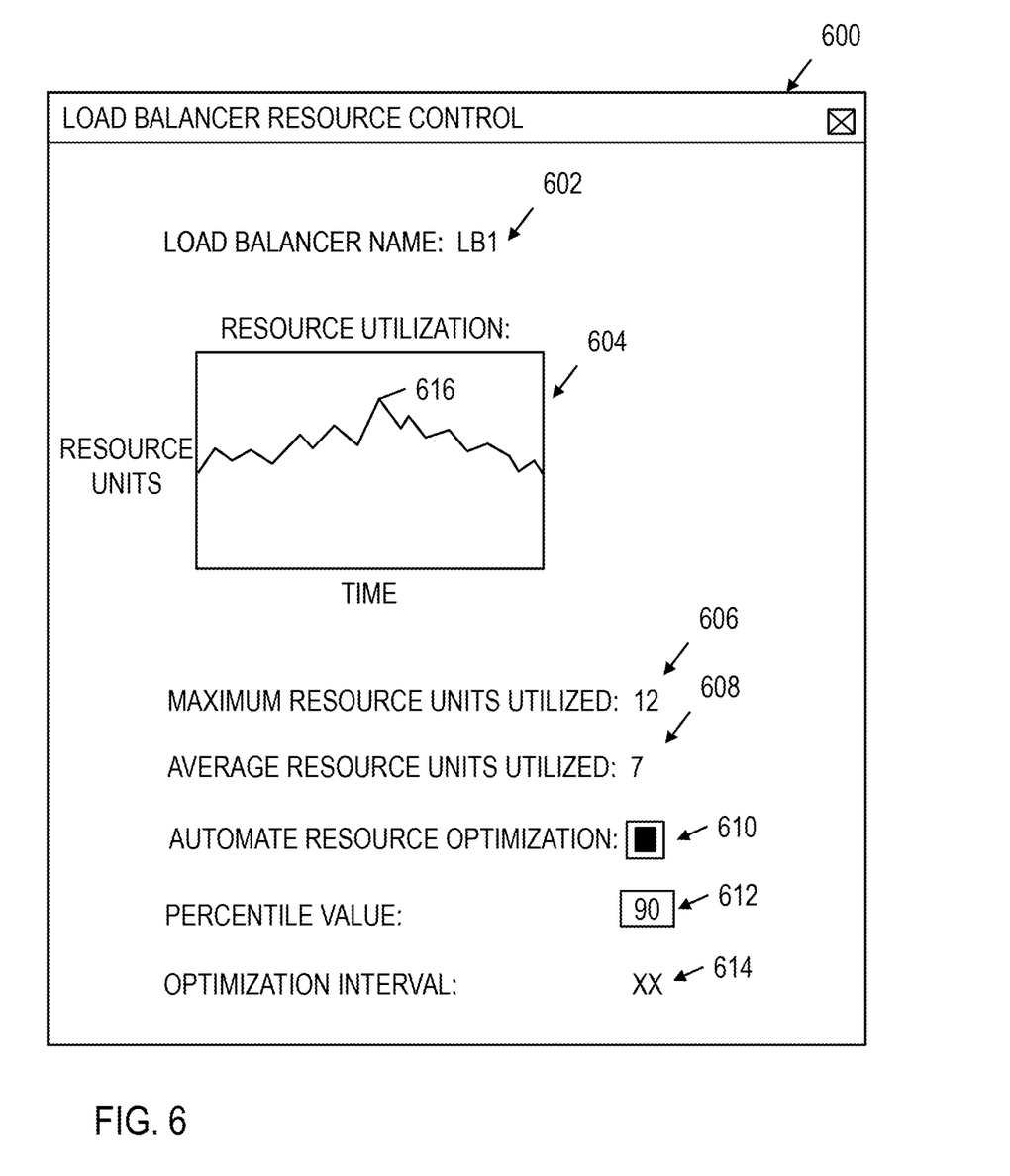
FIG. 6 shows a dialog that displays measured load balancer resource utilization of computing resources and allows entry of parameters for controlling allocation of computing resources to a load balancer in accordance with various embodiments.

A customer associated with the load balancer 124 may specify various parameters that affect the operation of the resource control service 106. Such parameters may be stored in the data store 116 (e.g., in association with other parameters applicable to the load balancer 124) and referenced by the resource control service 106 to manage adjustments to the computing resources of the load balancer 124. For example, a customer may specify a time interval, such as a number of days, over which historical computing resource utilization is to be considered in determining the amount of computing resources to allocate to the load balancer 124. Similarly, the customer may specify what percentile of the measured resource utilization values or what percentage of a given statistical value is to be applied to determine the amount of computing resources to be allocated to the load balancer 124. Each customer may independently assign such parameters to each load balancer 124. An example of specification of parameters related to allocation of computing resources to the load balancer 124 is shown in FIG. 6, which will be discussed below.

Changing the amount of computing resources allocated to the load balancer 124 may include changing parameters recorded in the data store 116 that specify the amount and/or type of load balancer computing resources and adding an event flag to the event queue 112. The workflow server 110 detects the event flag, identifies the changed amount and/or type of load balancer computing resources recorded in the data store 116, and allocates or deallocates computing resources from the load balancer 124 in accordance with resource parameters recorded in the data store 116. Allocation of additional resources to the load balancer 124 may cause the workflow server 110 may create additional virtual machines 122A and instances of the load balancer node 142, while deallocation of resources from the load balancer 124 may cause the workflow server 110 to free or remove from service instances of the virtual machine 122A and the load balancer node 142.

Figure 2:
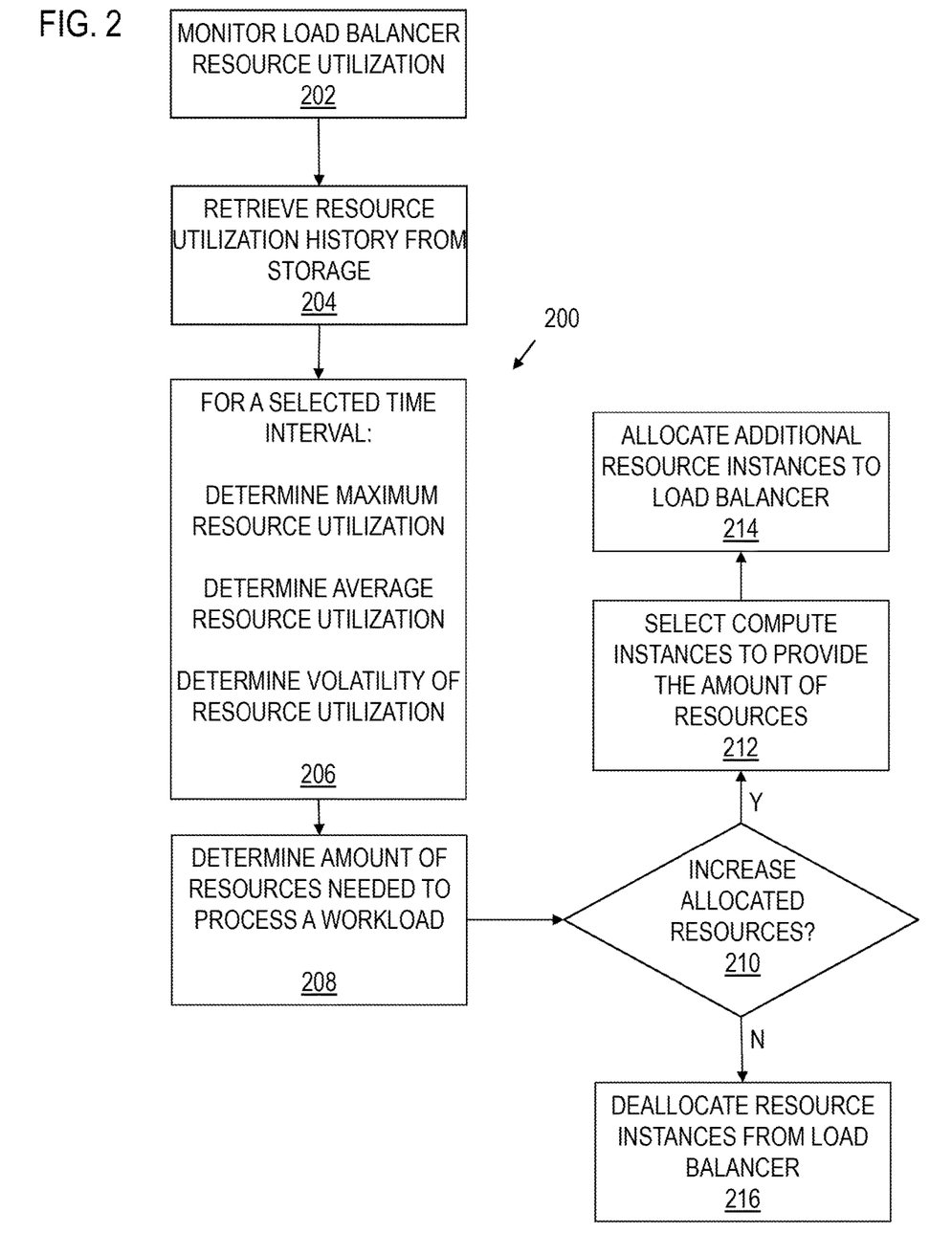
FIG. 2 shows a flow diagram for a method for controlling allocation of computing resources to a load balancer in accordance with various embodiments.

FIG. 2 shows a flow diagram for a method 200 for controlling allocation of computing resources to a load balancer in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 200 may be provided by instructions executed by a computer of the web service platform 134.

In block 202, the load balancer 124 is operating and applying allocated computing resources to distribute network traffic 138 to the various instances of the application 126. The resource monitor 104 is collecting computing resource utilization information from the load balancer 124 and storing the utilization information as utilization history in a storage device, such as data store 116 or log 108. Additional details regarding acquisition of load balancer resource utilization history are provided in FIG. 3.

In block 204, the resource control service 106 retrieves the resource utilization history, or a portion thereof, from the data store 116, log 108, or other storage device for analysis and determination of an amount and type computing resources to be allocated to the load balancer 124.

In block 206, the resource control service 106 processes the resource utilization history retrieved from storage to determine what amount of computing resources were used by the load balancer 124 to process the workload presented to the load balancer 124 in a predetermined historical time interval. For example, the resource control service 106 may determine the amount of computing resources utilized by the load balancer 124 in the last day, week, month, or other time interval to process the traffic presented to the load balancer 124 during the time interval. The amount of computing resources utilized by the load balancer 124 may be expressed via various statistical parameters of the resource utilization history. The resource control service 106 may analyze the resource utilization history to determine the maximum amount of computing resources used by the load balancer 124 in the predetermined historical time interval. Additionally or alternatively, the resource control service 106 may analyze the resource utilization history to determine the mean amount of computing resources used by the load balancer 124 in the predetermined historical time interval. The resource control service may also arrange the measurements of resource utilization in a storage array in order of increasing utilization to facilitate percentile selection. The resource control service 106 may also compute a measure of the volatility of the utilization of computing resources by the load balancer 124 over the predetermined historical time interval. For example, the resource control service 106 may compute the standard deviation or variance of the utilization of computing resources by the load balancer 124 over the predetermined historical time interval.

In block 208, the resource control service 106 determines an amount of computing resources needed by the load balancer 124 to process a particular workload. The particular workload may be the workload presented to the load balancer 124 during the predetermined historical time interval analyzed in block 206. Generally, the resource control service 106 determines the amount of computing resources needed by the load balancer 124 based on the statistical parameters computed in block 206. The resource control service 106 may also consider other factors and information in determining the amount of computing resources to be allocated to the load balancer 124. Determination of the amount of computing resources to be allocated to the load balancer 124 is explained in more detail in FIG. 4.

In block 210, the resource control service 106 has determined the amount of computing resources to be allocated to the load balancer 124. If the amount of computing resources to be allocated to the load balancer 124 is the same as the amount of computing resources currently allocated to the load balancer 124, then no allocation of additional computing resources or deallocation of currently allocated computed resources is necessary.

If the amount of computing resources to be allocated to the load balancer 124 is less than the amount of computing resources currently allocated to the load balancer 124, then, in block 216, the management service 102 deallocates computing resources from the load balancer 124 such that the amount of computing resources allocated to the load balancer after the deallocation is equivalent to the amount of resources specified by the resource control service 106.

If the amount of computing resources to be allocated to the load balancer 124 is greater than the amount of computing resources currently allocated to the load balancer 124, then, in block 212, the resource control service 106 selects additional computing resources to be allocated to the load balancer 124. If computing resources are packaged a compute instances, then the resource control service selects the compute instances to be allocated to the load balancer 124. Additional information regarding the selection of compute instances to provide computing resources to the load balancer 124 is provided in FIG. 5.

In block 218, the additional computing resources are allocated to the load balancer 124. The resource control service 106 may initiate a change, such as an increase or decrease, in the amount of computing resources allocated to the load balancer 124 by storing in the data store 116 values that specify the amount of computing resources to be allocated to the load balancer 124. The values may specify an increase or decrease in the amount of computing resources to be allocated to the load balancer 124 relative to the amount of computing resources currently allocated to the load balancer 124. The workflow server 110 may be triggered via an event flag stored in the event queue 112 by the resource control service 106 to allocate computing resources to the load balancer 124 as per the values stored in the data store 116.

Figure 3:
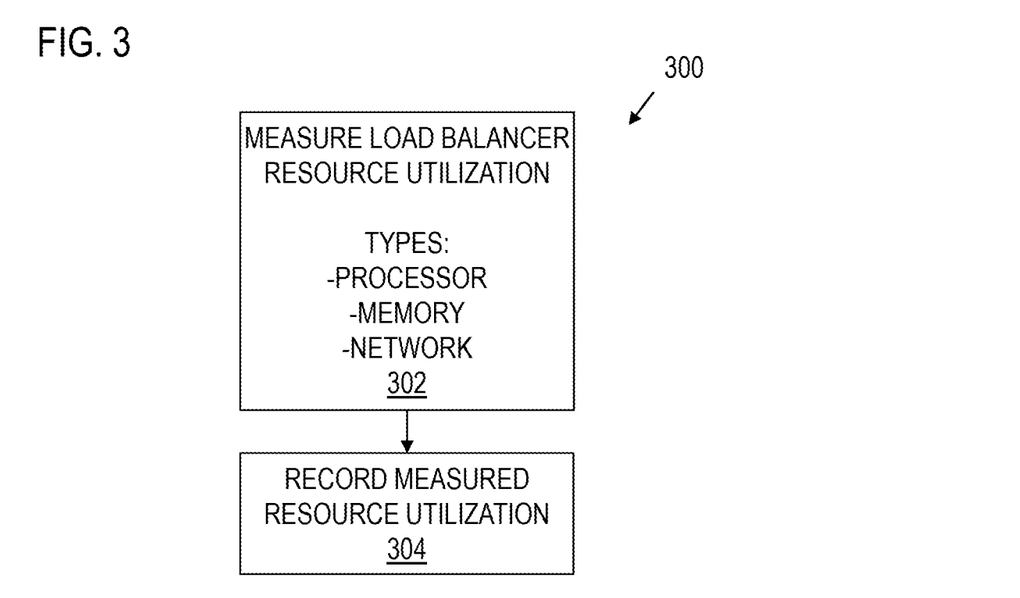
FIG. 3 shows a flow diagram for a method for monitoring computing resource utilization in a load balancer in accordance with various embodiments.

FIG. 3 shows a flow diagram for a method 300 for monitoring computing resource utilization in a load balancer in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300 may be provided by instructions executed by a computer of the web service platform 134. The operations of FIG. 3 may be performed as part of the operations of block 202 of FIG. 2 to monitor computing resource utilization by the load balancer 124.

In block 302, computing resource utilization by the load balancer 124 is measured. The load balancer 124 utilizes various types of computing resources to distribute traffic to the applications 126. For example, the load balancer 124 may utilize memory resources, processor resources, secondary storage resources, network resources, and/or other computing resources to distribute network traffic. Utilization of each of the various types of computing resources applied the load balancer 124 is measured. For example, distinct measurements of memory utilization, processor utilization, and network utilization may be made. Utilization measurements may be provided in units appropriate to each computing resource. For example, memory use may be measured in gigabytes, network utilization may be measured in transactions per second, processor utilization may be measured in instructions executed per second. Alternatively, computing resource utilization may be measured in terms of the percentage of the total allocated resource utilized at a particular time or over a particular interval. Embodiments of the load balancer 124 may include an agent that measures the utilization of the various computing resources and transfers the measurements to the resource monitor 104. Computing resource utilization measurements may be performed at any selected periodic or non-periodic time interval.

The resource utilization measurements are provided to the resource monitor 104. In block 304, the resource monitor 104 stores the resource utilization measurements in a storage device, such as the data store 116 or the log 108. The stored resource utilization measurements may form a time series that illustrates the historical utilization of computing resources by the load balancer 124. If the resource utilization measurements are to be stored in standard units, such as LCUs, then the resource monitor 104 analyzes the utilization of the various computing resources and converts the individual utilization measurements for the different computing resources to a standard unit that encompasses utilization of all of the different computing resources.

Figure 4:
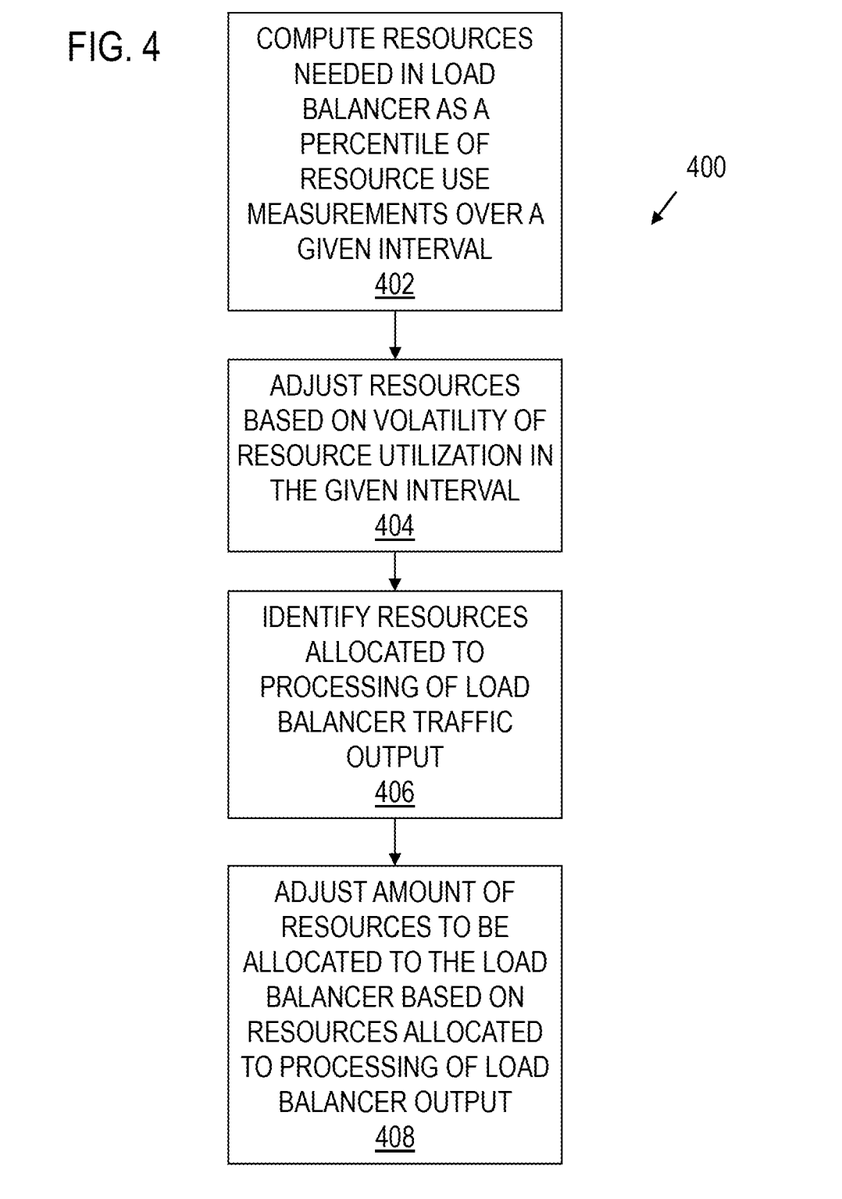
FIG. 4 shows a flow diagram for a method for determining an amount of computing resources needed to process a workload in a load balancer in accordance with various embodiments.

FIG. 4 shows a flow diagram for a method 400 for determining an amount of computing resources needed to process a workload in a load balancer in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer of the web service platform 134. The operations of FIG. 4 may be performed as part of the operations of block 208 of FIG. 2 to determine the amount of computing resources to allocate to the load balancer 124.

In block 402, the resource control service 106 selects, based on the analysis of historical computing resource utilization in block 206, an amount of computing resources needed by the load balancer 124 to process a workload. In some embodiments, the resource control service 106 may select the amount of computing resources to be a percentile of the values of resource utilization acquired in the historical time interval or a percentage of the computing resources utilized by the load balancer 124 in the historical time interval analyzed in block 206. The amount of computing resources utilized by the load balancer 124 in the historical time interval may be deemed to be the maximum amount of computing resources utilized by the load balancer 124 in the historical time interval, the mean amount of computing resources utilized by the load balancer 124 in the historical time interval, or another value of computing resources utilized by the load balancer 124 in the historical time interval.

For example, if the historical time interval is 3 days, then the resource control service 106 may select the 100th percentile of the amounts of computing resources utilized by the network device during the historical time interval to be allocated to the network device. If the historical time interval is 7 days, then the resource control service 106 may select the 99th percentile of the amounts of computing resources utilized by the network device during the historical time interval to be allocated to the network device. If the historical time interval is 14 days, then the resource control service 106 may select the 90th percentile of the amounts of computing resources utilized by the network device during the historical time interval to be allocated to the network device. The time intervals and percentiles used in the examples above are illustrative, and embodiments may apply any time interval and percentile to determine a suitable amount of computing resources to allocate to the load balancer 124.

In block 404, the resource control service 106 can adjust the amount of computing resources to be allocated to the load balancer 124 based on the volatility of the resource utilization in the historical time interval. If the measure of volatility computed in block 206 indicates that resource utilization in the historical time interval is highly volatile, then the resource control service 106 may increase the amount of computing resources to be allocated to the load balancer 124 to reduce the risk that a sudden increase in resource utilization results in the load balancer 124 being unable to provide timely processing of traffic. Thus, the resource control service 106 may increase the amount of computing resources to be allocated to the load balancer 124 as a function of, or in correspondence with, the volatility of historical utilization of computing resources by the load balancer 124.

In block 408, the resource control service 106 identifies computing resources allocated to processing of traffic distributed by the load balancer 124. For example, the resource control service 106 may identify compute instances allocated to the application 126 or other services that process traffic distributed by the load balancer 124.

In block 410, the resource control service 106 can adjust the amount of computing resources to be allocated to the load balancer 124 based on the amount of computing resources allocated to processing of traffic 140 distributed by the load balancer 124. For example, a larger amount of computing resources allocated to processing of traffic 140 distributed by the load balancer 124 may indicate that a greater amount of traffic is to be processed and distributed by the load balancer 124. Accordingly, if the resource control service 106 identifies an increase in the amount of computing resources allocated to processing of traffic distributed by the load balancer 124, then the resource control service 106 may increase the amount of computing resources to be allocated to the load balancer 124 to reduce the risk that load balancer 124 will unable to provide timely processing and distribution of the anticipated greater expected amount of traffic. Thus, the resource control service 106 may increase the amount of computing resources to be allocated to the load balancer 124 as a function of, or in correspondence with, the amount of computing resources allocated to processing of traffic 140 distributed by the load balancer 124.

Figure 5:
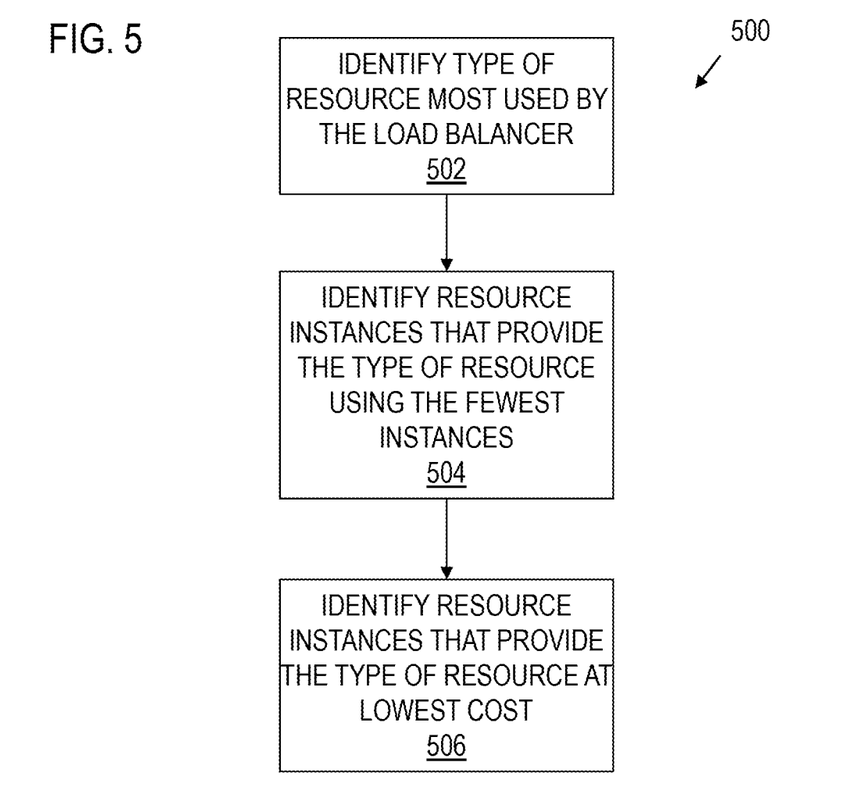
FIG. 5 shows a flow diagram for a method for selecting computing resources for allocation to a load balancer in accordance with various embodiments.

FIG. 5 shows a flow diagram for a method 500 for selecting computing resources for allocation to a load balancer in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer of the web service platform 134. The operations of FIG. 5 may be performed as part of the operations of block 212 of FIG. 2 to select compute instances to provide the computing resources to be allocated to the load balancer 124.

In block 502, the resource control service 106 identifies a type of computing resource that was most used by the load balancer 124 during the historical time interval analyzed in block 206. The identified type of computing resource may be any of the various types of computing resources used by the load balancer 124. For example, the identified type of computing resource may be memory, processor, network, secondary storage, etc.

In block 504, the resource control service 106 identifies the types of compute instances available for allocation to the load balancer 124. The resource control service 106 determines the number of each the available types of compute instances that are needed to provide the amount of computing resources needed by the load balancer 124. For example, memory may be the type of computing resource most used by the load balancer 124 during the historical time interval analyzed in block 206, and 10 gigabytes of memory may be needed for allocation to the load balancer 124. If a type A compute instance provides 2 gigabytes of memory, then 5 type A compute instances are needed to provide the 10 gigabytes of memory. If a type B compute instance provides 5 gigabytes of memory, then 2 type B compute instances are needed to provide the 10 gigabytes of memory. The resource control service 106 may select a type of compute instance for allocation to the load balancer 124 that minimizes the number of compute instances to be allocated. The resource control service 106 may minimize the number of compute instances to be allocated by selecting type B compute instances for allocation to the load balancer 124.

In block 506, the resource control service 106 determines the cost of providing the needed computing resources to the load balancer 124 using each of the available types of compute instances. Continuing the example above, type A compute instances may be available at cost X, and type B compute instances may be available at cost 2X. As a result, the total cost of allocation of 5 type A compute instances is 5X, and the total cost of allocation of 2 type B compute instances is 4X. The resource control service 106 may select a type of compute instance for allocation to the load balancer 124 that minimizes the cost of compute instances to be allocated. The resource control service 106 may minimize the cost of compute instances to be allocated by selecting type B compute instances for allocation to the load balancer 124.

FIG. 6 shows a dialog 600 that displays measured load balancer resource utilization of computing resources and allows entry of parameters for controlling allocation of computing resources to a load balancer in accordance with various embodiments. The information provided in the dialog 600 shows how the load balancer 124 has utilized computing resources over time and allows for customer control of parameters used by the resource control service 106 to allocate computing resources for use by the load balancer 124. The dialog 600 may be rendered as a web page displayed on the API requester 132 where the content of the dialog is transferred to the API requester 132 from the API server 114.

In the dialog 600, field 602 shows the name or identifier of the load balancer (e.g., load balancer 124) for which resource utilization information is displayed. A graph 604 of resource utilization by the load balancer 124 is provided. The graph 604 shows units of a computing resource utilized by the load balancer 124 over time. In some embodiments, the resource units may be LCUs. In other embodiments, the resource units may be specific to a particular computing resource. For example, memory used (e.g., gigabytes), processor capacity used (e.g., percentage of allocated processing capacity), network capacity used (e.g., number of transfers or amount transferred per time interval) over time may be presented. Some embodiments of the graph 604 may provide information for the computing resource most highly used by the load balancer 124. Some embodiments of the dialog 600, may include multiple graphs 604 showing utilization of each computing resource by the load balancer 124.

Field 606 of the dialog 600 shows the maximum number of resource units utilized by the load balancer 124 over a time interval (e.g., a selected time interval (a week, a month, etc.). For example, the maximum number of resource units utilized by the load balancer 124 may correspond to the value at point 616 of the graph 604.

Field 608 of the dialog 600 shows the mean number of units of a resource utilized by the load balancer 124 over a selected time period. Some embodiments of the dialog 600 may show additional or different parameters of resource utilization. For example, a measure of volatility may also be displayed.

Field 610 of the dialog 600 allows for enabling and disabling of automated control of load balancer resource allocation. For example, in some embodiments, selection of automated computing resource allocation may disable customer entry of parameters related to computing resource allocation, and enable the resource control service 106 to allocate computing resources to the load balancer 124 based on default or previously established parameters.

Field 612 and 614 of the dialog 600 allow a customer to enter parameters that the resource control service 106 applies to determine an amount of computing resources to allocate to the load balancer 124. Field 612 allows a customer to enter a percentile value of the measured values of resources used, or a percentage value to be applied to a maximum, average, or other value of computing resources historically utilized by the load balancer 124. Field 612 allows a customer to enter a time interval value that specifies the historical interval over which computing resource utilization is to be considered for determination of an amount of computing resources to be allocated to the load balancer 124. The time interval value, may be expressed, for example, in days.

Figure 7:
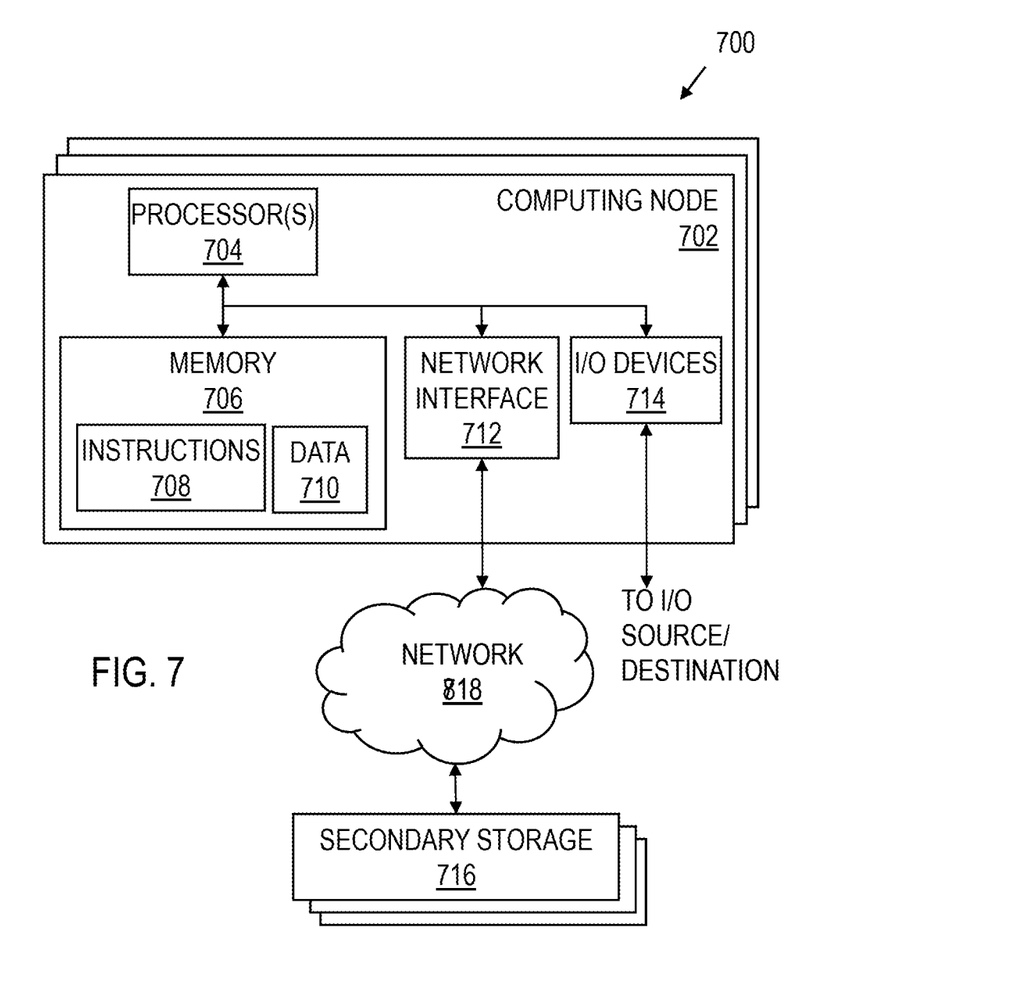
FIG. 7 shows a schematic diagram for a computing system suitable for implementation of a load balancer and resource manager that controls the computing resources allocated to the load balancer in accordance with various embodiments.

FIG. 7 shows a schematic diagram for a computing system suitable for implementation of a load balancer and resource manager that controls the computing resources allocated to the load balancer in accordance with various embodiments. The computing system 700 includes one or more computing nodes 702 and secondary storage 716 that are communicatively coupled via a network 718. One or more of the computing nodes 702 and associated secondary storage 716 may be applied to provide the functionality of the web services platform 134, including the load balancer 124, the management service 102, the resource monitor 104, the resource control service 106, the workflow server 110, the API server 114, the data store 116, the event queue 112, the application 126, etc.

Each computing node 702 includes one or more processors 704 coupled to memory 706, network interface 712, and I/O devices 714. In some embodiments of the system 100, a computing node 702 may implement the functionality of more than one component of the system 100. In various embodiments, a computing node 702 may be a uniprocessor system including one processor 704, or a multiprocessor system including several processors 704 (e.g., two, four, eight, or another suitable number). Processors 704 may be any suitable processor capable of executing instructions. For example, in various embodiments, processors 704 may be general-purpose or embedded microprocessors implementing any of a variety of instruction set architectures (ISAs), such as the x86, PowerPC, SPARC, or MIPS ISAs, or any other suitable ISA. In multiprocessor systems, each of processors 704 may commonly, but not necessarily, implement the same ISA. Similarly, in a distributed computing system such as one that collectively implements the web services platform 134, each of the computing nodes 702 may implement the same ISA, or individual computing nodes and/or replica groups of nodes may implement different ISAs.

The memory 706 may include a non-transitory, computer-readable storage medium configured to store program instructions 708 and/or data 710 accessible by processor(s) 704. The system memory 706 may be implemented using any suitable memory technology, such as static random access memory (SRAM), synchronous dynamic RAM (SDRAM), nonvolatile/Flash-type memory, or any other type of memory. Program instructions 708 and data 702 implementing the functionality disclosed herein are stored within system memory 706. For example, instructions 708 may include instructions that when executed by processor(s) 704 implement the load balancer 124, the management service 102, the resource monitor 104, the resource control service 106, the workflow server 110, the API server 114, the data store 116, the event queue 112, and/or other components of the web services platform 134 disclosed herein.

Secondary storage 716 may include volatile or non-volatile storage and storage devices for storing information such as program instructions and/or data as described herein for implementing the web services platform 134. The secondary storage may include various types of computer-readable media accessible by the computing nodes 702 via the network 718. A computer-readable medium may include storage media or memory media such as semiconductor storage, magnetic or optical media, e.g., disk or CD/DVD-ROM, or other storage technologies. Program instructions and data stored on the secondary storage 716 may be transmitted to a computing node 702 for execution by a processor 704 by transmission media or signals via the network 718, which may be a wired or wireless network or a combination thereof.

The network interface 712 may be configured to allow data to be exchanged between computing nodes 702 and/or other devices coupled to the network 718 (such as other computer systems, communication devices, input/output devices, or external storage devices). The network interface 712 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 714 may include one or more display terminals; keyboards, keypads, touchpads, scanning devices, voice or optical recognition devices, or any other devices suitable for entering or retrieving data by one or more computing nodes 702. Multiple input/output devices 714 may be present in a computing node 702 or may be distributed on various computing nodes 702 of the system 700. In some embodiments, similar input/output devices may be separate from computing node 702 and may interact with one or more computing nodes 702 of the system 100 through a wired or wireless connection, such as over network interface 712.

Those skilled in the art will appreciate that computing system 700 is merely illustrative and is not intended to limit the scope of embodiments. In particular, the computing system 700 may include any combination of hardware or software that can perform the functions disclosed herein, including computers, network devices, internet appliances, PDAs, wireless phones, pagers, etc. Computing node 702 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of computing devices configurable to implement a plurality of compute instances of a provider network; and
one or more of the computing devices configured to implement:
a network device configured to receive traffic directed to an application; and
a resource manager configured to:
measure and record a plurality of values of utilization of a plurality of different types of computing resources by the network device;
determine an amount of computing resources needed by the network device to process a given workload as a selected percentile of the values of utilization in a predetermined historical time interval; and
allocate the amount of computing resources to the network device.

2. The system of claim 1, wherein the plurality of compute instances comprise different amounts of each of the different types of computing resources, and the resource manager is configured to allocate compute instances to the network device based, at least in part, on cost of the amount of computing resources provided by the compute instances.

3. The system of claim 1, wherein the resource manager is configured to evaluate volatility of usage of computing resources over the historical time interval, and set the amount of resources based on a statistical measure of the volatility over the historical time interval.

4. The system of claim 3, wherein the resource manager is configured to increase the amount of computing resources to allocate the network device in correspondence with the statistical measure of the volatility.

5. A method, comprising:
configuring a plurality of computing devices to implement a plurality of compute instances of a provider network;
allocating one or more of the compute instances to implement a first network device that receives traffic directed to an application;
determining a plurality of quantities of computing resources applied by the first network device to process a workload presented to the first network device over a predetermined precedent time interval;
setting an amount of computing resources to be allocated to the first network device to be a selected percentile of the quantities of computing resources utilized by the first network device during the predetermined precedent time interval;
changing a number or type of compute instances to allocate to the first network device in accordance with the amount of computing resources to be allocated to the first network device.

6. The method of claim 5, further comprising measuring and maintaining a record of usage of a plurality of different types of computing resources by the first network device over the predetermined precedent time interval.

7. The method of claim 6, wherein the plurality of compute instances comprise different amounts of each of the different types of computing resources, and the method further comprises selecting the number or type of the compute instances to allocate to the first network device based, at least in part, on relative cost of the compute instances.

8. The method of claim 5, further comprising:
allocating one or more of the compute instances to implement a second network device that receives traffic in the provider network;
determining quantities of computing resources applied by the second network device to process a workload presented to the second network device;
assessing volatility of usage of computing resources by the second network device;
setting an amount of computing resources to be allocated to the first network device to be a selected percentile of the quantities of computing resources utilized by the second network device adjusted based on the volatility of usage of computing resources by the second network device;

allocating the amount to computing instances to the first network device.

9. The method of claim 5, further comprising:

assessing volatility of usage of computing resources over the precedent time interval; and setting the amount of computing resources to be provided via the compute instances based on a statistical measure of the volatility over the precedent time interval.

10. The method of claim 9, further comprising increasing the amount of computing resources to allocate the first network device via the compute instances in correspondence with the statistical measure of the volatility.

11. The method of claim 5, further comprising:

monitoring an amount of computing resources allocated to process network traffic received from the first network device; and setting the amount of computing resources to allocate to the first network device via the compute instances based on the amount of computing resources allocated to process the network traffic received from the first network device.

12. A system, comprising:

a plurality of computing devices configurable to implement a plurality of compute instances of a provider network; and one or more of the computing devices configured to implement:

a first network device configured to receive traffic directed to an application; and a resource manager configured to:

determine a plurality of quantities of computing resources employed by the first network device to process a first workload presented to the first network device over a predetermined precedent time interval;

set an amount of computing resources needed by the first network device to process a second workload to be a predetermined percentile of the quantities of computing resources employed by the first network device during the precedent time interval; and allocate the amount of computing resources to the first network device.

13. The system of claim 12, wherein the resource manager is configured to measure and record usage of a plurality of different types of computing resources by the first network device over the predetermined precedent time interval.

14. The system of claim 13, wherein the plurality of compute instances comprise different amounts of each of the different types of computing resources, and the resource manager is configured to allocate compute instances to the first network device based, at least in part, on relative cost of the amount of computing resources provided by the compute instances.

15. The system of claim 13, wherein the plurality of compute instances comprise different amounts of each of the different types of computing resources, and the resource manager is configured to allocate compute instances to the first network device based on which of the compute instances provides a largest amount or a lowest cost of a one of the different types of computing resources that is most highly utilized by the first network device over the predetermined precedent time interval.

16. The system of claim 13, wherein one or more of the computing devices are configured to implement a second network device configured to receive traffic directed to an application; and wherein the resource manager is configured to:

determine quantities of computing resources employed by the second network device to process a second workload presented to the second network device;

evaluate volatility of usage of computing resources by the second network device; over the precedent time interval, and set the amount of computing resources based on a statistical measure of the volatility over the precedent time interval set the amount of computing resources needed by the first network to be a predetermined percentile of the quantities of computing resources employed by the second network device adjusted based on the volatility of usage of computing resources by the second network device; and allocate the amount of computing resources to the first network device.

17. The system of claim 12, wherein the resource manager is configured to evaluate volatility of usage of computing resources over the precedent time interval, and set the amount of computing resources based on a statistical measure of the volatility over the precedent time interval.

18. The system of claim 17, wherein the resource manager is configured to set the amount of computing resources to allocate the first network device in correspondence with the statistical measure of the volatility.

19. The system of claim 12, wherein the resource manager is configured to set the amount of computing resources to allocate to the first network device based on an amount of computing resources allocated to process traffic received from the first network device.

20. The system of claim 12, wherein the resource manager is configured to:

receive, via an application programming interface, a customer specified percentile value to be applied to amounts of computing resources employed by the first network device to process the first workload presented to the first network device over the predetermined precedent time interval; and apply the percentile value to determine the amount of computing resources to allocate to the first network device to process the second workload.

* * * * *